(12) United States Patent
Schultheiss et al.

(10) Patent No.: US 8,636,127 B2
(45) Date of Patent: Jan. 28, 2014

(54) FAN DRIVE DEVICE

(75) Inventors: Gerold Schultheiss, Pforzheim (DE);
Rudolf Stoklossa, Mühlacker (DE);
Roman Woiterski, Nordwestuckermark (DE)

(73) Assignee: BEHR GmbH & Co. KG, Stuttgart (DE)

( * ) Notice: Subject to any disclaimer, the term of this patent is extended or adjusted under 35 U.S.C. 154(b) by 1064 days.

(21) Appl. No.: 12/280,133

(22) PCT Filed: Feb. 12, 2007

(86) PCT No.: PCT/EP2007/001172
§ 371 (c)(1),
(2), (4) Date: Aug. 20, 2008

(87) PCT Pub. No.: WO2007/096071
PCT Pub. Date: Aug. 30, 2007

(65) Prior Publication Data
US 2009/0064946 A1 Mar. 12, 2009

(30) Foreign Application Priority Data
Feb. 22, 2006 (DE) .......................... 10 2006 008 576

(51) Int. Cl.
*F16D 35/02* (2006.01)
*F01P 7/04* (2006.01)
(52) U.S. Cl.
USPC ................. 192/58.61; 192/30 W; 192/113.23
(58) Field of Classification Search
USPC ........... 192/58.61, 58.62, 113.24, 113.4, 58.8
See application file for complete search history.

(56) References Cited

U.S. PATENT DOCUMENTS

| | | | |
|---|---|---|---|
| 4,056,178 A | 11/1977 | Detty | |
| 4,618,334 A * | 10/1986 | Miranti, Jr. | ............... 192/113.23 |
| 4,650,045 A | 3/1987 | Weible et al. | |
| 4,727,970 A * | 3/1988 | Reik et al. | ................... 192/113.4 |
| 4,987,986 A | 1/1991 | Kennedy et al. | |
| 5,358,382 A | 10/1994 | Muhlbach | |
| 5,560,462 A * | 10/1996 | Gustin | ......................... 192/58.42 |
| 5,855,266 A * | 1/1999 | Cummings, III | .......... 192/58.42 |
| 5,893,442 A | 4/1999 | Light | |
| 5,937,983 A | 8/1999 | Martin et al. | |
| 5,971,709 A * | 10/1999 | Hauser | ........................... 416/175 |
| 5,992,594 A | 11/1999 | Herrle et al. | |

(Continued)

FOREIGN PATENT DOCUMENTS

| | | |
|---|---|---|
| CN | 1106113 A | 8/1995 |
| DE | 27 18 723 C2 | 11/1977 |

(Continued)

*Primary Examiner* — Rodney Bonck
(74) *Attorney, Agent, or Firm* — Foley & Lardner LLP

(57) ABSTRACT

The invention relates to a fan drive device (1) for driving at least one fan impeller (2), comprising at least one first drivable coolable housing element (9, 10) with at least one output disc (13) which can be connected to the at least one drivable coolable housing element (9, 10) in such a way as to be capable of transmitting torque by fluid friction, wherein at least one fluid can be admitted to at least one torque-transmitting space, and the mass flow of said fluid can be regulated by means of a valve element (30), wherein the valve element (30) can be actuated by at least one actuator (26, 27), and at least a section of the actuator (26, 27) is arranged in at least one retaining element (33) for fastening to a motor unit.

29 Claims, 7 Drawing Sheets

(56) References Cited

U.S. PATENT DOCUMENTS

| | | | |
|---|---|---|---|
| 6,010,305 A * | 1/2000 | Hauser | 416/169 A |
| 6,021,747 A | 2/2000 | Gee et al. | |
| 6,206,639 B1 * | 3/2001 | Light et al. | 192/113.24 |
| 6,220,416 B1 | 4/2001 | Katoh et al. | |
| 6,382,915 B1 * | 5/2002 | Aschermann et al. | 416/169 A |
| 6,935,478 B2 | 8/2005 | Dräger et al. | |
| 2004/0223851 A1 | 11/2004 | Shiozaki et al. | |
| 2005/0189194 A1 * | 9/2005 | Lindauer et al. | 192/58.61 |
| 2005/0196297 A1 | 9/2005 | Baumgartner et al. | |
| 2006/0042902 A1 * | 3/2006 | Boyer | 192/58.61 |

FOREIGN PATENT DOCUMENTS

| | | |
|---|---|---|
| DE | 33 33 268 A1 | 4/1985 |
| DE | 40 23 394 A1 | 2/1991 |
| DE | 196 45 478 A1 | 5/1998 |
| DE | 197 35 417 A1 | 2/1999 |
| DE | 197 53 725 A1 | 6/1999 |
| DE | 103 24 314 A1 | 3/2004 |
| DE | 103 38 432 A1 | 3/2004 |
| DE | 699 11 824 T2 | 7/2004 |
| DE | 10 2004 009 073 A1 | 9/2005 |
| EP | 0 870 943 A1 * | 10/1998 |
| EP | 0 870 943 AA1 | 10/1998 |
| EP | 1 566 526 A2 | 8/2005 |
| EP | 1 630 443 A2 | 3/2006 |
| JP | 10281187 A | 10/1998 |
| WO | WO 99/09255 A1 | 2/1999 |

* cited by examiner

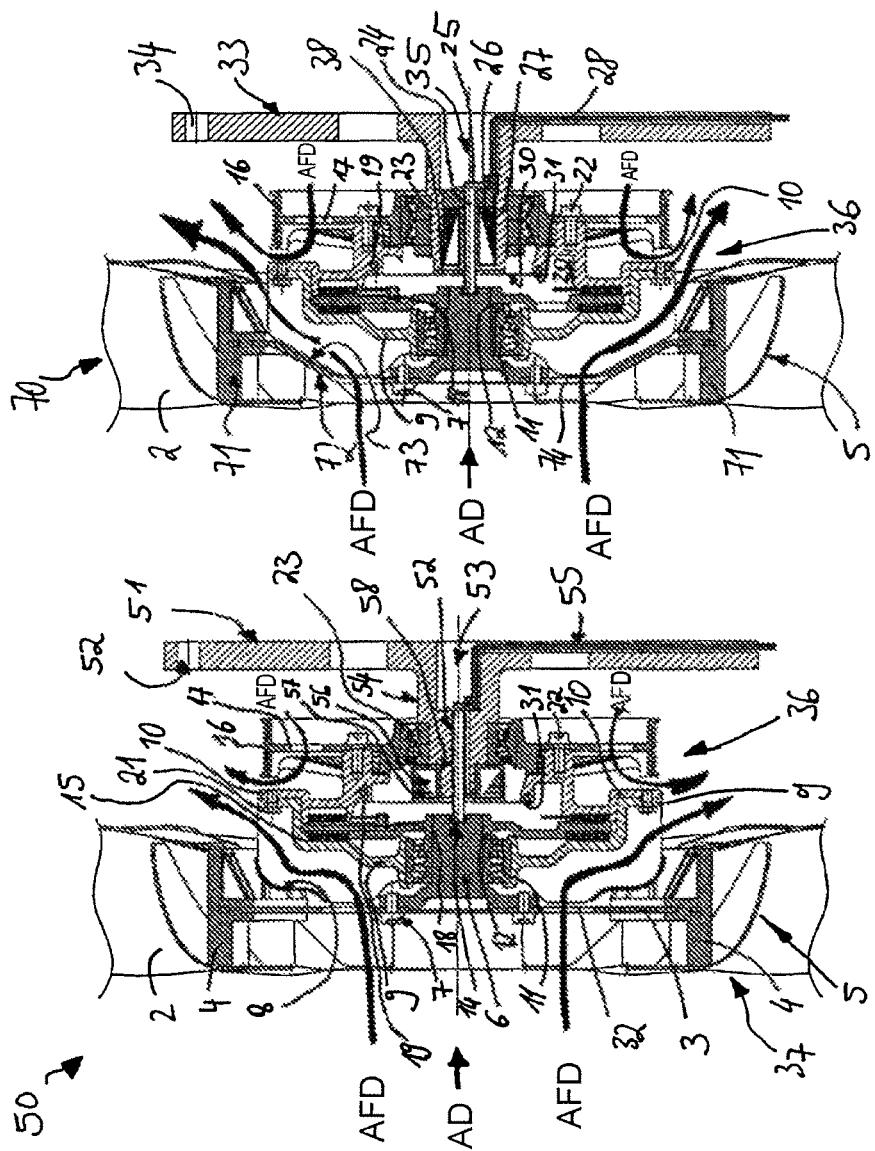

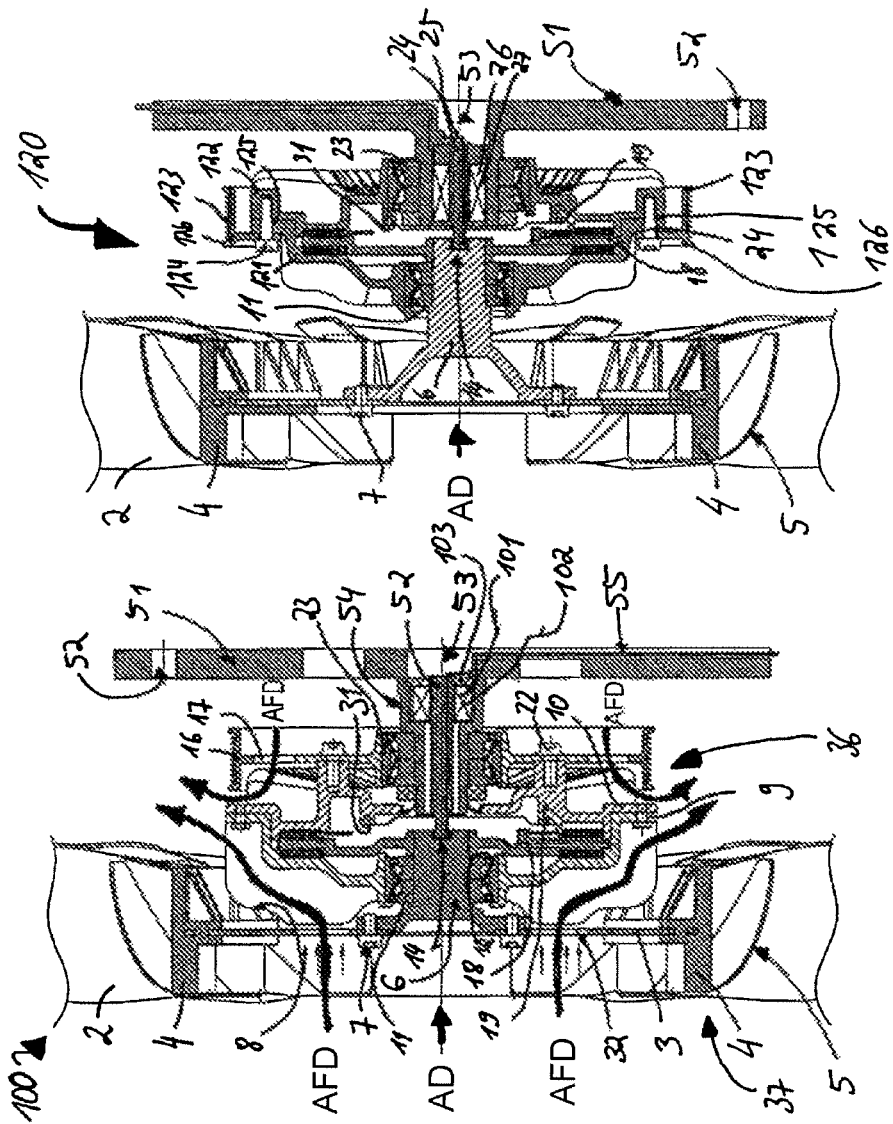

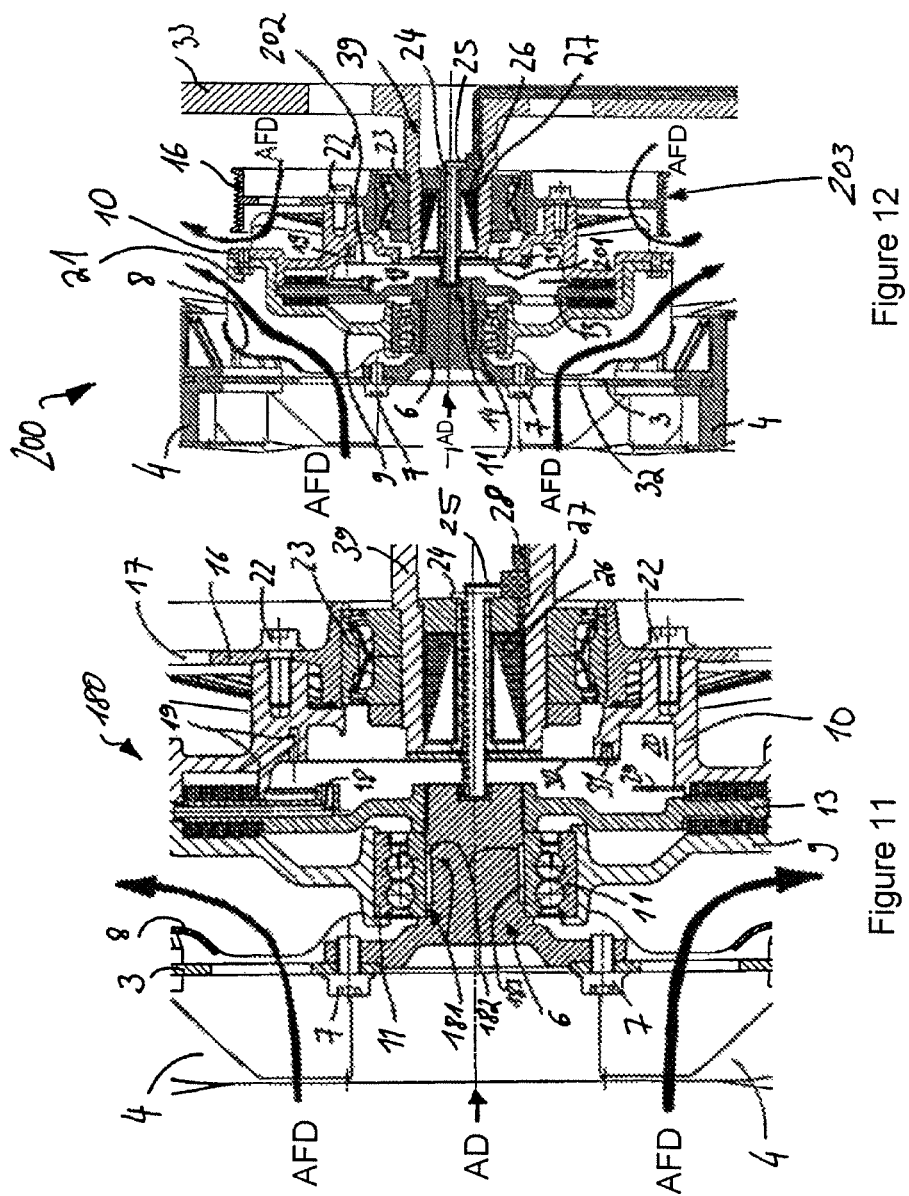

FAN DRIVE DEVICE

The present invention relates to a fan drive device for driving at least one impeller wheel.

Fans are known for cooling heat exchangers such as coolant coolers, charge air coolers, oil coolers, condensers for air conditioning systems, gas coolers for air conditioning systems etc. These fans are driven by means of at least one electric drive unit and/or by means of at least one fluid friction clutch.

The fans are used in particular for cooling the engine of motor vehicles with internal combustion engines. Said fans are frequently arranged on a separate bearing journal on the end wall of the engine. The fans are usually driven or can be driven by means of a belt drive.

Clutch devices are known which permit engagement and disengagement of the clutch according to the principle of dry friction. These clutch devices can be activated pneumatically or electromagnetically. These clutch devices usually have a belt pulley with which the belt drive can be driven. The bearing of the drivable belt pulley usually has a nonrotating bearing journal. In addition, the clutch device usually has pneumatic or electromagnetic activation devices. During assembly, the clutch device is usually firstly fastened to an end wall of the engine without a fan, in particular an impeller wheel, and connected to the belt drive. The fan, in particular the impeller wheel, is mounted subsequently.

This assembly sequence is particularly advantageous with clutch devices on which a large weight is acting.

The known clutch devices have infinitely variable regulation of the output speed. The fan is either entrained directly in a frictionally locking fashion or it remains at a very low idling speed over the residual drag torque of the bearing. Requirements such as a higher fan power, lower generation of noise and better utilization of energy cannot be met with the described fans.

Therefore, if the low idling speed is not sufficient during operation, the fan is activated to the maximum extent. This consumes a very large amount of energy and causes noise to be generated, which adversely affects the traveling comfort of a vehicle occupant.

In addition, fan drive devices which are regulated continuously are known according to the principle of fluid friction. Before assembly, these fan drive devices are connected to the fan. The vehicle usually has a bearing unit which is premounted, in particular on the end wall of the engine. A belt pulley, which is driven with a belt, is usually arranged on the bearing unit. During assembly of the vehicle, a rotating hub is subsequently pushed onto a premounted unit which is usually composed of a fan and fan drive device. Owing to the heavy weight which acts on the elements to be mounted, the assembly process is usually very strenuous. In the case of fan drive devices which function according to the principle of fluid friction, the drive device is controlled directly by means of the temperature, for example by means of a bimetal. For this purpose, the bimetal activation device is usually arranged on the rotating end side of the drive device since the temperature of the cooling air flowing out of the vehicle cooler is used as a controlled variable.

In addition to the actuation of fluid friction clutches by means of bimetal, fluid friction clutches which can be actuated electromagnetically are known. They use a nonrotating solenoid. This nonrotating solenoid requires an additional bearing compared to a fluid friction clutch which is actuated by means of bimetal. In addition, it is necessary to support the electrical connection in the region of rotating components.

Fan drive devices which function according to the fluid friction principle have slip power which generates heat. The heat causes the clutch components to heat up. The slip power which is generated is proportional to the transmitted torque and proportional to the difference between the drive speed and output speed. The fan drive device, in particular the fluid friction clutch, has components which must not exceed a specific temperature. These components are, for example, bearings, in particular roller bearings. In order to drive the generated heat from the clutch, the housing of the clutch is usually provided with cooling fins which are intended to improve the transmission of heat to the surrounding air. These cooling fins are usually arranged radially on the rotating clutch housing.

Fan drive devices are known in which the clutch housing of a fluid friction clutch rotates at the rotational speed of the fan, in particular of the impeller wheel. The rotational speed of the fan, in particular of the impeller wheel, is lower than the drive speed. When the clutch housing rotates, the centrifugal force gives rise to forced convection which increases with the square of the rotational speed of the clutch housing. Given a low degree of activation of the fan, i.e. at a low output speed, the clutch housing is cooled to a relatively small degree. Given degrees of activation of 30% to 70%, a particularly large amount of heat is generated. The maximum deficit in the thermal balance is usually in the range from 30% to 40% of activation of the fan since the dissipated thermal power is at a minimum.

DE 103 38 432 A1 discloses a fluid friction clutch, in particular for a motor vehicle fan. The fluid friction clutch has, in the state in which it is disengaged from the drive element and output element, a reservoir space in the drive element which largely accommodates the hydraulic fluid. When the clutch is activated, the hydraulic fluid passes from the reservoir space into the clutch region. The hydraulic fluid at least partially closes the gap between the drive element and output element in the clutch region and causes a torque to be transmitted. The output element has concentric projections. In addition, the clutch device from DE 103 38 432 A1 has a controllable device for closing and opening flow paths. In a first position, the device opens the flow path for the inflow of hydraulic fluid into the clutch region and closes the return flow. In a second position, the device closes the inflow and opens the return flow. The torque device essentially has a magnet armature which is connected to the control shaft in a frictionally locking fashion, a flux U conducting ring which is connected to the drive shaft in a frictionally locking fashion and a coil which is arranged in the housing in a rotationally fixed fashion. If the coil is energized, a current-dependent torque is produced between the magnet armature and the flux-conducting ring and the control shaft is rotated relative to the drive shaft. The electromagnetically controlled torque and control device is composed of a rotationally fixed coil part which is secured on the drive shaft by means of a roller bearing, and the adjustment elements which rotate with the output shaft.

DE 103 24 314 A1 discloses a fan drive for motor vehicles. In said document, a fluid friction clutch is arranged on a secondary assembly. As a result, the fluid friction clutch is cooled better because it runs at a relatively high rotational speed and has a better supply of cooling air than if it were integrated into the fan hub. DE 103 24 314 A1 discloses a fan drive with a belt pulley. The driven belt pulley is connected to the housing or to a housing lid in a rotationally fixed fashion by means of screws, and is supported in a rotatable fashion on the drive shaft by means of a bearing. As a result, the belt drive is driven directly onto the housing, i.e. the output side of the clutch. The belt pulley drives a drive shaft by means of a freewheel, and therefore drives the housing including the fan. If the belt drive is activated via the clutch, the rotational speed of the belt pulley is higher than that of the drive shaft, as a result of which the housing is entrained directly via the belt pulley, and the freewheel rolls over the drive shaft. Drive is no longer provided by the flange shaft. The fan therefore runs at an increased rotational speed. In addition, DE 103 24 314 A1 discloses a fluid friction clutch which itself also runs at an increased rotational speed and is cooled better at the front, as a result of which it can dissipate a higher power loss or slip power.

DE 10 2004 009 073 A1 discloses an adjustable drive for a water pump in a motor vehicle. The adjustable drive has a rotatably mounted shaft on which at least one output element which is mounted in a rotationally fixed fashion and at least one drive element which is mounted in a rotatable fashion are arranged. A clutch region, which can hold a viscous fluid, is arranged between the drive element and the output element.

The adjustable drive has at least one first and at least one second flow path which connects a fluid reservoir space to the clutch region between the drive element and the output element. The adjustable drive also has a device whose position can be varied with at least one actuator which changes at least one through-opening of at least one flow path of the drive. The valves are activated with the at least one actuator. The at least one actuator is arranged outside the rotating clutch. The valves can be controlled magnetically. These are, in particular, seat valves. The magnetically controllable device has at least one axially movable armature on which a magnetic actuating force acts. A pulse transmitter for determining the rotational speed is provided on the shaft of the drive and/or of the coolant pump.

The object of the present invention is to improve a fan drive device of the type mentioned at the beginning.

A fan drive device for driving at least one impeller wheel is proposed, which fan drive device has at least one first drivable coolable housing element, at least one output disk which can be connected to the at least one drivable coolable housing element in such a way that it can transmit torque by fluid friction, wherein at least one fluid can be admitted to at least one torque-transmitting space, and the mass flow of said fluid can be regulated by means of a valve element, wherein the valve element can be activated with at least one actuator, wherein the actuator is arranged, at least in certain sections, in at least one retaining element for fastening to an engine unit.

The at least one first housing element is drivable or can be driven or is driven. In addition, the at least one housing element is coolable or can be cooled or is cooled. The at least one drive disk is connectable or can be connected or is connected to the at least one drivable coolable housing element in such a way that it can transmit torque by fluid friction.

The phrase can transmit torque by fluid friction is to be understood as meaning that, owing to frictional forces which act between particles of a fluid, at least one torque can be transmitted or is transmitted between the at least one first housing element and the at least one output disk.

At least one fluid can be admitted or is admitted to at least one torque-transmitting space.

Torque-transmitting space is to be understood as meaning, in particular, a space which is formed in at least one first housing element. In this space, the torque can be transmitted from the at least one first drivable coolable housing element to the at least one output disk, in particular by fluid friction.

The mass flow of the fluid, in particular of the viscous fluid, can be regulated or is regulated by means of a valve element. The valve element can be activated or is activated with at least one actuator. An actuator is to be understood here as meaning, in particular, a coil, in particular a solenoid.

The actuator, in particular the coil, is arranged, at least in certain sections, in at least one retaining element for fastening to an engine unit.

In this context, the actuator can be arranged in its entirety or only in certain sections or partially in the at least one retaining element.

A retaining element may be understood to be, in particular, a flange which can be used for fastening to an engine unit. In this context, the at least one retaining element, in particular the flange, can have at least one bore or at least one duct or at least one opening in which the actuator can be arranged.

In addition, a fan drive device is proposed, with at least one sensor being arranged, at least in certain sections, in the at least one retaining element for fastening to an engine unit.

The sensor here may be a rotational speed sensor which can measure, for example, an output speed or drive speed. In addition, the sensor can be for measuring temperature. The sensor is arranged here, at least in certain sections, in the at least one retaining element. The retaining element can be understood in particular as being a flange for fastening to an engine unit. The sensor may be arranged completely or only in certain sections or partially in the retaining element here. The retaining element may have an opening, at least a bore or at least a duct, in which the sensor can be arranged.

In addition, a fan drive device is proposed, wherein the actuator is arranged on the retaining element, and the at least one sensor is arranged, at least in certain sections, in the at least one retaining element.

The actuator can be, in particular, a coil, in particular a solenoid, which can be arranged on the retaining element and/or connected, at least in certain sections, to the retaining element or fastened, at least in certain sections, on the retaining element. The retaining element can be understood, in particular, to be a flange. At least one sensor can be arranged completely or at least in certain sections or partially in the at least one retaining element. The sensor can be a sensor for measuring rotational speed and/or a sensor for measuring temperature.

In addition, a fan drive device is proposed, wherein the actuator is arranged on a coolant pump, and at least one hub and one belt pulley are embodied in such a way that they conduct magnetic flux.

The actuator can be a coil, in particular a solenoid, which is arranged on a coolant pump. The coolant pump may be used here to pump coolant, in particular a cooling fluid, in particular cooling water, of a coolant cooler.

Hub is to be understood here in particular as being a bore-shaped cutout in a component which is or can be connected to a shaft. At least one hub and a belt pulley are embodied in such a way that they can conduct magnetic flux.

The phrase can conduct magnetic flux is to be understood here as meaning the at least one hub and the at least one belt pulley are formed from a material which conducts the magnetic flux.

In one advantageous refinement, the actuator is a solenoid. The solenoid is particularly advantageous since it can be actuated in a cost-effective and simple way.

In one advantageous development, the at least first housing element can be driven by means of the at least one belt pulley. In particular, the at least one belt pulley can drive, or drives, the at least first housing element. The housing element can particularly advantageously be driven at a high drive speed, wherein the at least first housing element can be cooled in a particularly advantageous way.

In one preferred embodiment, a viscous fluid can be admitted or is admitted to the torque-transmitting space through at least one bore. In particular, the viscous fluid can flow into the torque-transmitting space through the at least one bore. In this way different torques can be transmitted particularly advantageously from the at least one housing element to the at least one drive disk.

Furthermore, it can particularly preferably be provided that the retaining element is a flange which is arranged in a rotationally fixed fashion. The retaining element can particularly advantageously be arranged on or fastened to an engine unit.

In addition it is possible to provide that the first housing element and/or at least one second housing element have first concentric labyrinthine cutouts, and the output disk has second concentric labyrinthine cutouts corresponding thereto.

In this way, at least one torque, in particular different torques, can be particularly advantageously transmitted from the first housing element and/or the second housing element to the output disk by means of fluid friction forces.

In a further advantageous embodiment, the fluid can be made to flow through the first and second cutouts, at least in certain sections, as a result of which in particular at least one torque of the housing element can be transmitted to the output disk. In this way, at least one torque, in particular different torques, can particularly advantageously be transmitted from the housing element to the output disk.

In one advantageous embodiment, at least one knob element for holding back the viscous fluid is formed from the output disk. In this context, the viscous fluid can particularly advantageously be discharged from the torque-transmitting space.

In one advantageous development, the fan drive device has at least one storage space for storing the viscous fluid. In this way, a different rotational speed of the output disk can be particularly advantageously generated in that viscous fluid can be fed to the torque-transmitting space.

In addition, it is possible to provide that the at least one storage space rotates at least a drive speed of the belt pulley.

In this way, the storage space, which can be formed in particular in the interior of the at least one housing element, can be particularly advantageously cooled.

In one advantageous development, the valve element has a valve lever with which at least one flow duct opening of a first flow duct can be closed. In this way, the mass flow of the viscous fluid which can be admitted to the torque-transmitting space can be particularly advantageously regulated.

In addition it is possible to provide that the valve lever can be connected, in particular elastically, to the at least one housing element. The valve lever is particularly advantageously connected to the housing element.

In one advantageous embodiment, the valve lever can be pivoted about a fastening point. In this way, the valve lever can be actuated in a particularly advantageous way.

In one advantageous development, the fan drive device has at least one soft-magnetic conducting element. A magnetic flux can particularly advantageously be conducted through the at least one soft-magnetic conducting element.

In one advantageous embodiment, at least one sensor element for measuring the output speed can be arranged, in particular centrally, on a fan flange shaft. In this way, the output speed of the fan flange shaft can be measured particularly easily, for example by means of a sensor.

In one advantageous embodiment, the sensor is for measuring the output speed and/or is a Hall sensor. In this way, the output speed of the output disk and/or of the fan flange shaft can be measured particularly easily and cost-effectively.

Furthermore, it is particularly preferably possible to provide that at least one first cable for supplying power to the actuator and/or a second cable for supplying power to the sensor can be arranged or is arranged in the retaining element. In this way, the actuator and/or the sensor can particularly advantageously be supplied with power.

In one advantageous development, the first housing element and/or the second housing element have cooling fins. In this way, the fan drive device can particularly advantageously be cooled and is suitable for relatively high fan drive power levels.

In addition, it is possible to provide that the at least one impeller wheel has at least one flow-guiding element for cooling the housing element. In this way, the housing element can particularly advantageously be cooled even better, as a result of which even higher fan drive power levels can be achieved.

In a further advantageous embodiment, the impeller wheel has at least one opening for the throughflow of air and for cooling the housing element. In this way, the housing element can particularly advantageously be cooled and higher fan drive power levels can particularly advantageously be achieved.

Furthermore, it is particularly preferably possible to provide that at least one flange plate of the impeller wheel has the at least one opening for the throughflow of air and for cooling the housing element. In this way, the housing element can particularly advantageously be cooled and higher fan drive power levels can be achieved.

In one development, at least one flange plate of the impeller wheel has the at least one opening for the throughflow of air and for cooling the housing element. In this way, the housing element can particularly advantageously be cooled.

In addition it is possible to provide that at least one flange plate of the impeller wheel has the at least one opening for the throughflow of air and for cooling the housing element. In this way, the at least one housing element can particularly advantageously be cooled.

In a further advantageous embodiment, the at least one flange plate is embodied, at least in certain sections, as a flow-guiding element for cooling the housing element. In this way, the flow-guiding element can be manufactured particularly easily.

Furthermore it is particularly preferably possible to provide that the at least one flange plate is embodied, at least in certain sections, as a radial blower for cooling the housing element. In this way, the housing element can particularly advantageously be cooled.

In one development, the at least one opening is embodied as a hood for cooling the housing element. A hood is to be understood in particular as a type of inlet duct with an inlet opening or a type of inlet diffuser. In this way, the housing element can particularly advantageously be cooled.

A further advantageous embodiment is characterized in that the belt pulley has at least one belt pulley opening for cooling the housing element. In this way, the at least one housing element can particularly advantageously be cooled.

Furthermore, it is particularly preferably possible to provide that the belt pulley can be connected to the first housing element and/or to the second housing element in a positively locking fashion, in particular by screwing. In this way, the housing element can particularly advantageously be driven by the belt pulley.

In addition it is possible to provide that the output disk has at least one output disk opening for cooling at least one hub section of the output disk. In this way, the at least one hub section of the drive disk can particularly advantageously be cooled.

In one development, the fan drive device has at least one bearing for supporting the first and/or second housing element and/or the belt pulley. In this way, the first and/or second housing element and/or the belt pulley can particularly advantageously be supported.

It is also possible to provide that at least one bearing seat section of a fan shaft has at least one, in particular circumferential, cutout for cooling the output disk. In this way, the at least one bearing can particularly advantageously be cooled.

Furthermore, it is particularly preferably possible to provide that at least one bearing bushing, in particular composed of a material which is a poor conductor of heat, can be arranged or is arranged on the at least one bearing seat section of the fan shaft in order to cool the output disk. In this way, the at least one bearing can particularly advantageously be cooled.

In a further advantageous embodiment, the output disk is connected to the at least one impeller wheel. In this way, the impeller wheel can be driven in a particularly advantageous fashion.

In addition, it is possible to provide that the first drivable housing element and/or the at least second drivable housing element are mounted so as to be rotatable with respect to the retaining element.

Furthermore, it is particularly preferably possible to provide that the first drivable housing element and/or the at least second drivable housing element are mounted so as to be rotatable with respect to the drive disk.

In a further advantageous embodiment, the output disk is mounted so as to be rotatable with respect to the retaining element.

In one advantageous development, at least one belt pulley unit is designed so as to be capable of being dismounted or is dismounted from a fluid-flow-regulating unit for maintenance and/or repair purposes, and/or so as to be capable of being mounted with the fluid-flow-regulating unit, in particular after maintenance and/or repair work, and can be re-assembled with the fluid-flow-regulating unit.

Further advantageous refinements of the invention emerge from the drawings.

Exemplary embodiments of the invention are illustrated in the drawing and will be explained in more detail below, but this is not intended to restrict the invention. In said drawing.

Figure 6:
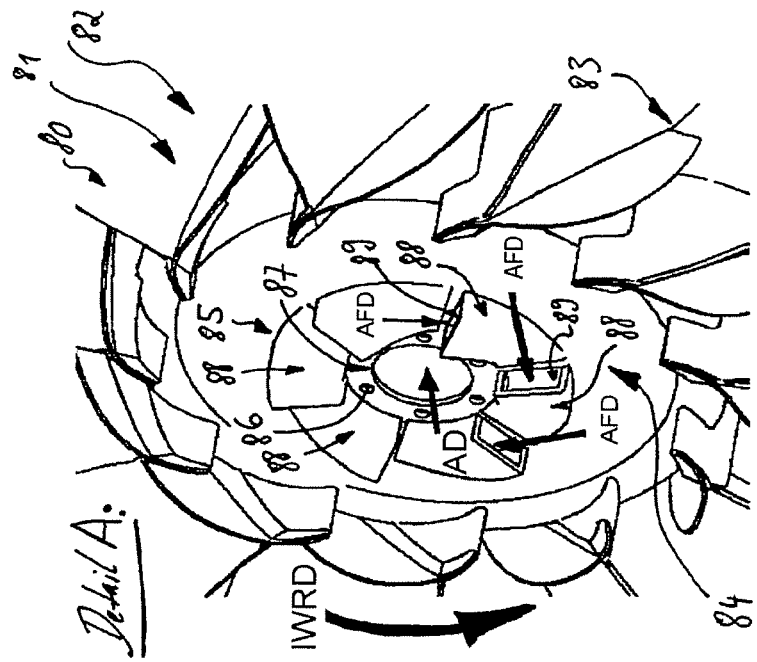
Figure 5:
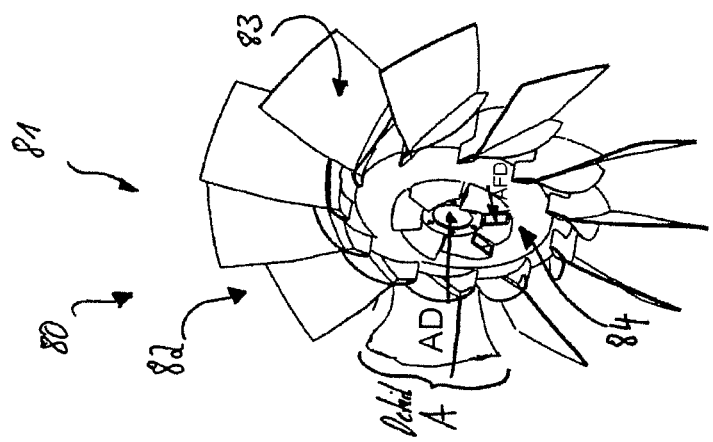
Figures 9, 10:
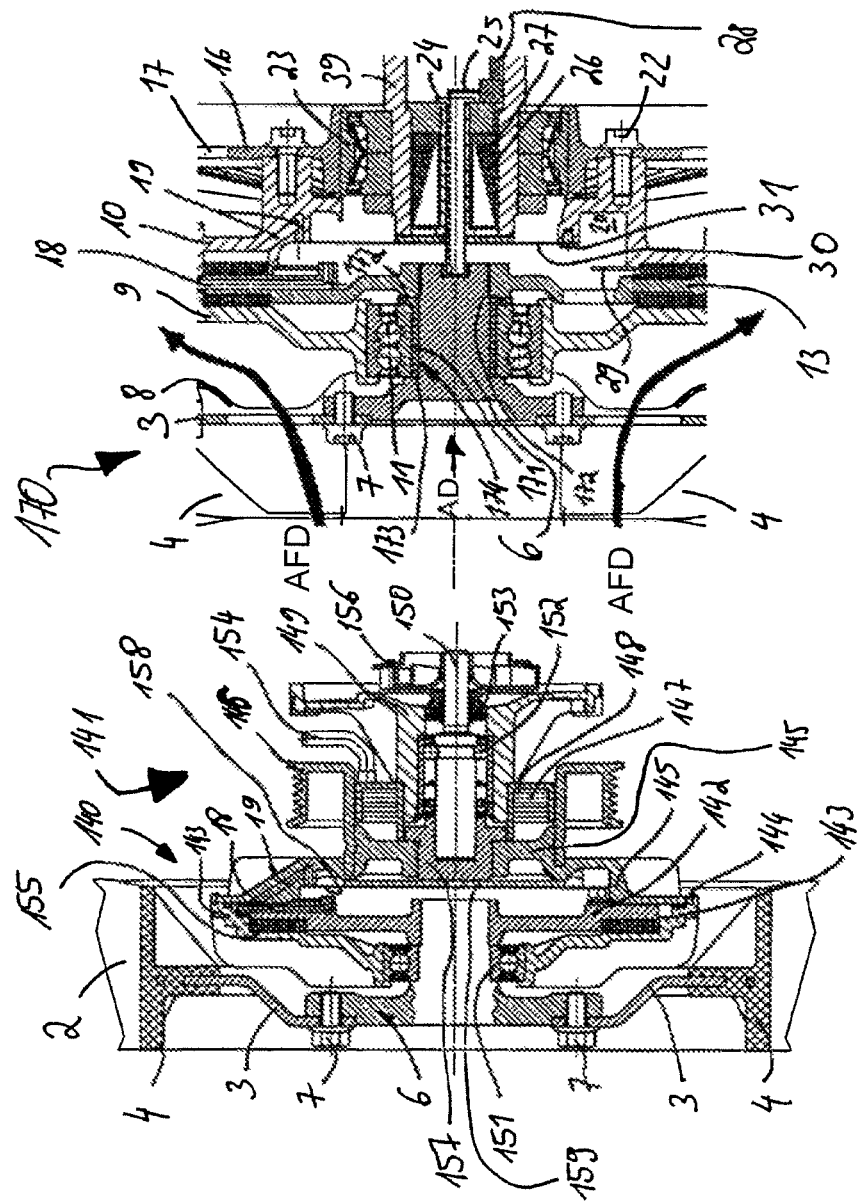

FIG. 3 is a sectional illustration of a further embodiment of the fan drive unit, FIG. 4 is a sectional illustration of a further embodiment of the fan drive unit, FIG. 5 is an isometric illustration of an impeller wheel with at least one flow-guiding element, FIG. 6 is a detail illustration A of the at least one flow-guiding element, FIG. 7 is a sectional illustration of a fan drive unit with which at least one water pump can be driven, FIG. 8 is a sectional illustration of a further embodiment of a fan drive unit, FIG. 9 is a sectional illustration of a fan drive unit with a coolant pump drive unit, FIG. 10 is a sectional illustration of a further embodiment of a fan drive unit with a bearing bushing, FIG. 11 is a sectional illustration of a further embodiment of a fan drive unit with a circumferential cutout in the bearing seat, and FIG. 12 is a sectional illustration of a further embodiment of a fan drive unit with a belt pulley unit which can be dismounted from a fluid-flow-regulating unit.

Figure 1:
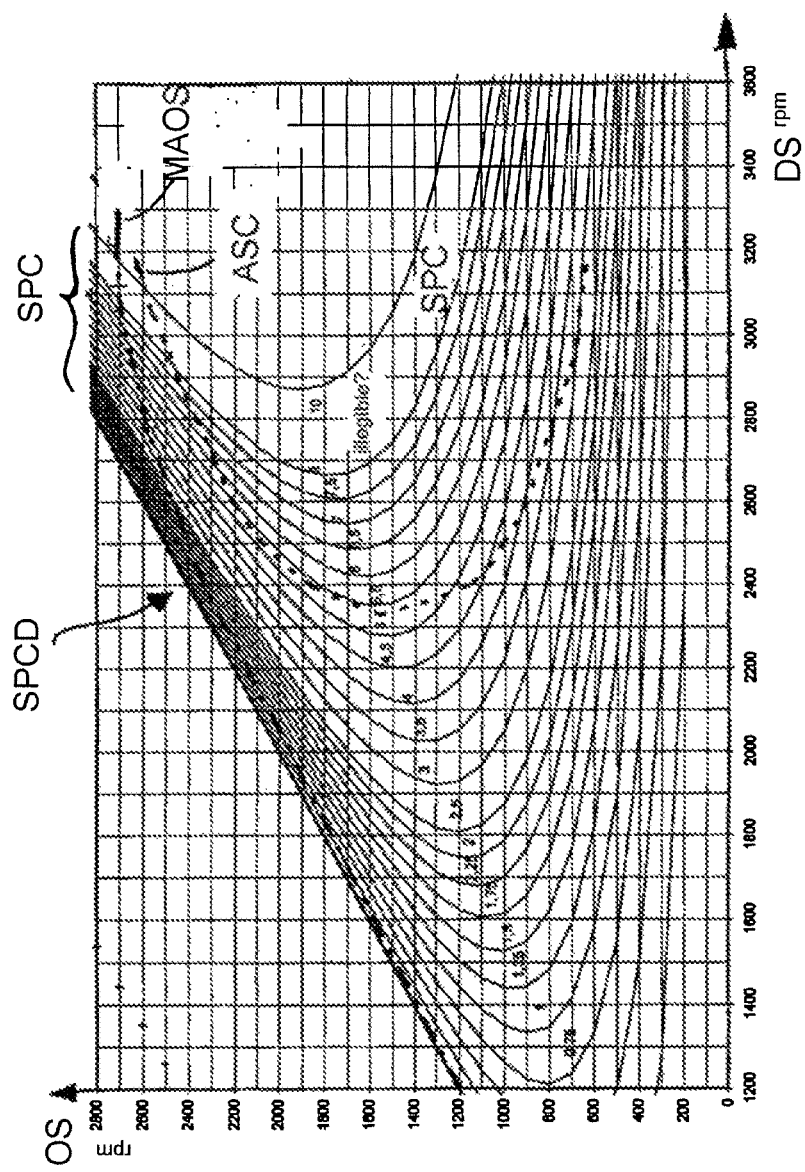
FIG. 1 shows a slip power characteristic diagram.

FIG. 1 shows a slip power characteristic diagram SPCD.

In the slip power characteristic diagram SPCD the output speed OS is plotted in revolutions per minute (rpm) against the drive speed DS in revolutions per minute (rpm). In the illustrated exemplary embodiment drive speeds DS of 1,200 to 3,600 rpm and output speeds OS of 0 to 2,800 rpm are plotted. In addition, slip power curves SPC of different slip power levels are plotted in kilowatts (kW) in the slip power characteristic diagram SPCD. In the illustrated exemplary embodiment, the slip power curves for 0.75 kW, 1 kW, 1.25 kW, 1.5 kW, 1.75 kW, 2.25 kW, 2 kW, 2.5 kW, 3 kW, 3.5 kW, 4 kW, 4.5 kW, 5 kW, 5.5 kW, 6 kW, 6.5 kW, 7 kW, 7.5 kW, 8 kW and 10 kW are plotted. Intermediate values for these plotted curves can be obtained by interpolation. The slip power curve for 8 kW is denoted by way of example by SPC 8.

The slip powers, which are plotted as slip power curves SPC in the slip power characteristic diagram SPCD, are produced during operation of the fan drive device on the basis of the fluid friction the at least one drivable housing element (not illustrated) transmits at least one torque to the output disk. The slip power generates heat which has to be conducted away from the fan drive device. If this heat is not conducted away from the fan drive device, inadmissibly high component temperatures of the clutch, in particular of the visco clutch, which lead or can lead to total failure of the fan drive unit, are produced.

The maximum achievable output speed MAOS is plotted in rpm against the drive speed DS as a curve. Likewise, a boundary line of the admissible slip power ASP for steady-state operation is illustrated, by way of example. This boundary line describes the heat capacity which can be dissipated for a given housing rotational speed which usually corresponds to the output speed OS. The region BUHBT, which is bounded to the left by the maximum admissible slip power curve SPC, leads to inadmissibly high component temperatures of the clutch, in particular of the visco clutch. From the diagram it is apparent that limitations on the admissible output speeds OS have to be accepted at drive speeds DS which are essentially higher than 2,350 rpm.

Figure 2:
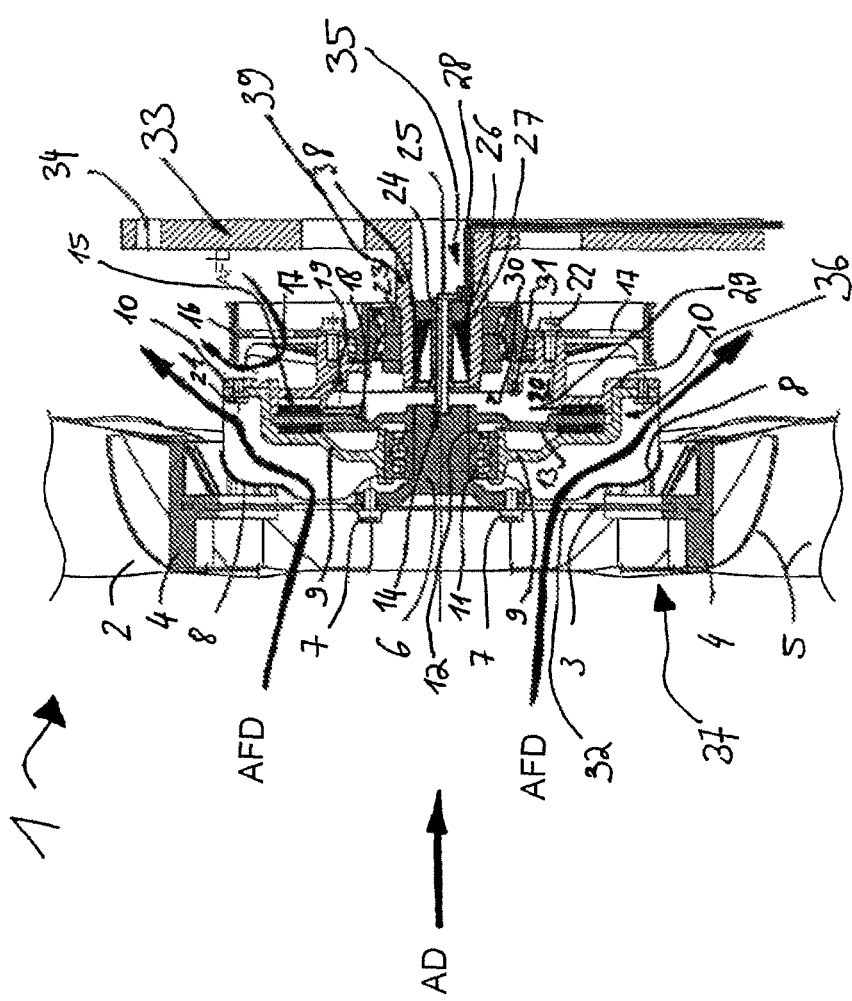
FIG. 2 is a sectional illustration of the fan drive device.

FIG. 2 is a sectional illustration of the fan drive device 1.

The fan drive device 1 has an impeller wheel 2 of a fan 37, a visco clutch 36, a belt pulley 16 and a retaining element 33.

The fan 37 has a fan housing 4, an impeller wheel 2 and a flange ring 3. The impeller wheel 2 is constructed essentially from plastic. In particular, the impeller wheel 2 is manufactured by means of a shaping fabrication method such as injection molding, in particular plastic injection molding. The impeller wheel 2 has a plurality of fan blades 5.

The fan 37 also has a fan housing 4. The fan housing 4 is constructed essentially from plastic. The fan housing 4 is manufactured, or can be manufactured, in particular by means of a shaping fabrication method, such as injection molding, in particular plastic injection molding. In another exemplary embodiment, the impeller wheel 2 and/or the fan housing 4 are constructed from a material which has a low density. The material can be, for example, a composite material, in particular a fiber composite material. A flange ring 3 is arranged in the fan housing 4. The flange ring 3 can be constructed from plastic or from a metal with a low density such as, for example, aluminum. In another exemplary embodiment, the fan housing 4 and the flange ring 3 are constructed in one piece. In another exemplary embodiment, the flange ring 3 is constructed as a simple plate. The plate can have a round shape or a rectangular shape or an oval shape or a shape which has the previously mentioned shapes. The flange ring 3 has at least one flange plate cutout 32, in particular a plurality of flange plate cutouts 32. The flange plate cutout 32 can have a round or oval or polygonal shape or a shape composed of the combination of the previously mentioned shapes.

At least one flow-guiding element 8, in particular a plurality of flow-guiding elements 8, is arranged on the fan housing 4. The flow-guiding elements can be constructed from plastic or from another material such as, for example, a metal with a low density such as, for example, aluminum. The flow-guiding elements cause, in particular, air to flow in the air flow direction AFD through the flange plate cutouts 32 of the flange ring 3 and to flow past the first housing element 9 and/or the second housing element 10, and to cool the visco clutch 36, in particular the first housing element 9 and/or the second housing element 10. In another exemplary embodiment, the at least one flow-guiding element 8 can be constructed in one part with the fan housing 4 and/or the flange ring 3. The flow-guiding element is manufactured, for example, by means of a primary shaping fabrication method such as molding, in particular injection molding or by means of a shaping fabrication method such as, for example, bending or pressing.

The fan shaft 6 has a flange (not denoted in more detail). The fan shaft 6 is connected in a positively locking fashion via this flange (not denoted in more detail) to the flange ring 3 by means of at least one first fastening element, in particular a plurality of fastening elements 7 such as, for example, screws and nuts etc. A first roller bearing 11, in particular a first ball bearing, in particular a two-row ball bearing, is arranged on the fan shaft 6. The inner bearing ring (not denoted in more detail) of the first roller bearing 11 is connected to the fan shaft 6 by means of a press fit.

In addition, the output disk 13 is arranged on the fan shaft 6. The fan shaft 6 has a bore (not denoted in more detail) via which the output disk 13 can be pushed onto the fan shaft 6. The output disk 13 can be connected to the fan shaft 6 by means of a press fit. In another exemplary embodiment, the output disk 13 is connected to the fan shaft 6 in a positively locking fashion. The fan shaft 6 is constructed from steel but it can also be constructed from aluminum or from a fiber composite material.

The output disk 13 is constructed from steel. In addition, the output disk 13 can also be constructed from a fiber composite material or from ceramic. The output disk 13 has concentric labyrinthine cutouts (not denoted in more detail). The cutouts are formed in the output disk 13 using, for example, a material-removing fabrication method such as turning, milling, grinding etc. In another exemplary embodiment, the concentric labyrinthine cutouts can be formed in the output disk 13 by means of a blasting method such as, for example, by means of a laser beam or by means of a shaping fabrication method or by means of a primary shaping fabrication method. The cutouts are arranged extending radially inward in a part of the output disk 13 (not designated in more detail) from the outermost radius of the output disk as far as an inner radian section. In section the part in which the labyrinthine cutouts are arranged has a shape like a trunk of a tree, extending from which a plurality of branches are arranged on the left and right of the trunk essentially at an angle of 90° with respect to the trunk.

The output disk 13 has a first flow duct 18. The flow duct 18 is embodied in such a way that a first bore runs in a radial direction of the output disk from radially on the outside toward the inside as far as a certain inner radius. For this purpose, a second bore is arranged essentially perpendicularly. The second bore is arranged at the level of the inner radius of the output disk. A ram pressure is generated from the visco clutch 36 by means of a knob (not illustrated), with the effect that fluid, in particular viscous fluid such as, for example, silicone oil, flows counter to the centrifugal force through the flow duct 18 into a storage space 20 of the visco clutch 36 or of the first housing element.

A housing (not denoted in more detail) with a first housing element 9 and a second housing element 10 is arranged around the output disk 13. The first housing element 9 and the second housing element 10 are connected to one another in a positively locking fashion by means of at least one second fastening element 21, in particular a plurality of second fastening elements 21. In another exemplary embodiment, the first housing element 9 and the second housing element 10 are connected to one another in a materially joined fashion, for example by soldering, bonding, welding etc. In another exemplary embodiment, the first housing element 9 and the second housing element 10 are embodied in one piece. In another exemplary embodiment, the housing elements 9, 10 are formed around the output disk 13 by primary shaping.

The first housing element 9 has a bore (not denoted in more detail) into which the first roller bearing 11 is pushed or pressed. The first housing element 9 has a part with labyrinthine concentric cutouts (not denoted in more detail) which correspond essentially to the labyrinthine concentric cutouts (not denoted in more detail) of the output disk 13.

The second housing element 10 also has, at least in certain sections, labyrinthine concentric cutouts which correspond essentially to the labyrinthine concentric cutouts (not denoted in more detail) of the output disk 13. The concentric labyrinthine cutouts are formed in the first housing element 9 and/or the second housing element 10 by means of a material-removing fabrication method such as, for example, turning, milling, grinding etc. In another exemplary embodiment, the labyrinthine concentric cutouts are formed in the first housing element 9 and/or in the second housing element 10 by means of a laser beam or by means of a primary shaping fabrication method such as, for example, molding or injection molding or by means of a shaping fabrication method such as, for example, pressing.

The first housing element 9 and/or the second housing element 10 are constructed from a metal such as, for example, steel or aluminum or from another lightweight metal. In particular, the first housing element 9 and/or the second housing element 10 are manufactured by means of a primary shaping fabrication method such as, for example, molding, in particular injection molding, in particular metal injection molding. In the illustrated exemplary embodiment, at least one bore 19, in particular two bores 19, are formed in the second housing element 10. The bores have an angle (not denoted) of 5° to 6°, in particular 10° to 50°, in particular 15° to 47°, in particular 20° to 45°, in particular 30° to 45°. Viscous fluid, in particular silicone oil, is introduced into the torque-transmitting space 15 via the bore 19 or the two bores by virtue of the centrifugal force and it flows into the torque-transmitting space 15.

A storage space 20 is formed in the second housing element 10. The storage space 20 is bounded, at least in certain sections, by a storage space disk 29 and a wall section (not denoted in more detail) of the second housing element 10. On the second housing element 10, a valve lever disk of a valve lever (not denoted in more detail) is connected in a rotatable fashion to the second housing element 10 via a fastening point 31. In particular, the valve lever disk 30 can carry out a pivoting movement about the fastening point 31. During the pivoting movement, the bore 19 is cleared, at least in certain sections. There are three possible positions of the valve lever disk 30 here. In one position 1, the bore 19 is closed so that no viscous fluid, in particular silicone oil, can enter the bore 19 from the storage space 20. If the valve lever disk 30 is in position 2, the bore 19 has a fluidic connection, at least in certain sections, to the storage space 20, with the result that fluid, in particular viscous fluid, such as silicone oil, can flow into the bore 19. If the valve lever disk 30 is in position 3, an opening (not denoted in more detail) of the bore 19 is completely cleared, with the result that viscous fluid, in particular silicone oil, can enter the bore 19.

The valve lever disk 30 is connected in a materially joined and/or positively locking fashion to an armature 38. The armature 38 can be actuated, or is actuated, by means of the actuator 26 or the solenoid 27. When the armature 38 is activated by the actuator 26 or the solenoid 27 it carries out, in particular, a rotational movement which is transmitted to the valve lever disk 30. The valve lever disk 30 and the armature 38 have at least one bore (not denoted in more detail) through which a sensor 24, in particular a rotational-speed-measuring sensor and/or a temperature-measuring sensor, is plugged. The second housing element 10 has at least one threaded bore, in particular a number of threaded bores, into which fastening elements 22, in particular third fastening elements such as, for example, screws are screwed. In this way the belt pulley 16, which can be driven with a belt (not illustrated), is connected to the second housing element 10, in particular in a positively locking or materially joined fashion. In another exemplary embodiment, the belt pulley 16 is connected to the first housing element 9. In another exemplary embodiment, the belt pulley 16 is embodied in one piece with the second housing element 10 and/or the first housing element 9.

The belt pulley 16 has at least one belt pulley opening 17, in particular a number of belt pulley openings 17. Air can flow through the belt pulley openings 17 when the belt pulley 16 turns or rotates, and said air cools the second housing element 10 and/or the first housing element 9. The belt pulley 16 has a bore (not denoted in more detail) which is arranged, in particular, in the center of the belt pulley. This bore forms a hub section (not denoted in more detail). In the hub section (not denoted in more detail), a second roller bearing 23, in particular a ball bearing, in particular a two-row ball bearing, is formed or arranged. The second roller bearing 23 is connected in a frictionally locking fashion to the belt pulley 16, in particular by means of an interference fit assembly. However, in the illustrated exemplary embodiment, the pairing of the second roller bearing 23 to the belt pulley 16 is embodied as play or a transition fit and the inner bearing ring (not denoted in more detail) is held with a nut (not denoted in more detail), wherein the outer ring of the second roller bearing 23 is embodied as a loose bearing, with the result that the outer bearing ring of the second roller bearing 23 can expand freely when heating occurs.

The inner bearing ring of the second roller bearing 23 is arranged on a retaining element 33, in particular on a flange. A shaft (not denoted in more detail) is formed, at least in certain sections, from the flange 33. The shaft has a first shaft shoulder (not denoted in more detail) and at least a second shaft shoulder (not denoted in more detail). The second roller bearing 23 is pushed onto the shaft section with the inner bearing ring (not denoted in more detail) as far as the second shaft shoulder (not denoted in more detail). The inner bearing ring is in contact, at least in certain sections, with the second shaft shoulder (not denoted in more detail). The inner bearing ring (not denoted in more detail) of the second roller bearing 23 is fastened on the shaft section of the retaining element 33, in particular of the flange, with a bearing securing means (not denoted in more detail), in particular a screw.

The retaining element 33 has at least one bore 34, in particular a plurality of bores 34. The retaining element, in particular the flange, is screwed onto, or connected to an engine unit (not illustrated) through the at least one bore 34, in particular through the plurality of bores 34, by means of fastening elements (not illustrated) such as, for example, screws on the motor unit (not illustrated). The retaining element shaft section 39 is formed from the retaining element 33, in particular from the flange. The retaining element 33 or the retaining element shaft section 39 has a cavity 35, in particular a bore. The retaining element shaft section 39 has, in the interior, a step (not denoted in more detail) which is embodied as a shoulder, in particular in a circumferential fashion. The cavity 35 of the retaining element 33, in particular the retaining element shaft section 39, has a first bore (not denoted in more detail) which has a larger diameter than a second bore (not denoted in more detail). The first bore (not denoted in more detail) is embodied essentially in the form of a cylinder. The second bore (not denoted in more detail) is also embodied in the form of a cylinder. The actuator 26, or respectively the solenoid 27, is arranged in the second bore (not denoted in more detail). The actuator 26 and solenoid 27 are embodied in such a way that they are in contact, at least in certain sections, with the bore. The actuator 26 and the solenoid 27 are embodied essentially in the form of a cylinder, with the result that they can be pushed, or are pushed, into the second bore (not denoted in more detail). In another exemplary embodiment, the actuator 26 and the solenoid 27 can be embodied in the form of a parallelepiped.

In addition, in the illustrated exemplary embodiment, a sensor 24 is arranged in the cavity 35 of the retaining element 33 or respectively of the retaining element shaft section 39. In the illustrated exemplary embodiment, the sensor 24 is a sensor for measuring rotational speed. In another exemplary embodiment, the sensor 24 can, however, also be a temperature sensor for measuring the temperature. The sensor 24 is arranged essentially concentrically with respect to the cavity 35 of the retaining element 33 or with respect to the cavity 35 of the retaining element shaft section 39. In another exemplary embodiment, the sensor 34 can also be arranged outside the center, wherein the center is to be considered essentially to be the axis of the second bore (not denoted in more detail) of the cavity 35. In the illustrated exemplary embodiment, the actuator 26 and the solenoid 27 have an axially symmetrical, essentially concentric bore in which the sensor 24 is arranged. In another exemplary embodiment (not illustrated), the sensor 24 is not arranged concentrically and axially symmetrically in the actuator 26 or respectively the solenoid 27 but rather is arranged outside the axis of the actuator 26 or of the solenoid 27. The at least one actuator cable 28, which is used, in particular, to supply power to the actuator 26 or respectively to the solenoid 27, is led away outwards from the cavity 35 of the retaining element 33, in particular of the flange or respectively of the holding element shaft section 39, from the retaining element 33, in particular of the flange. In addition, at least one sensor cable 25 of the sensor 24, in particular of the rotational speed sensor, is led outwards from the cavity 35 of the retaining element 33, in particular of the flange, or respectively of the retaining element shaft section 39. The sensor cable 25 serves essentially to supply power to the sensor 24. The at least one sensor cable 25 and the at least one actuator cable 28 have a common cable duct in which they are essentially arranged.

The retaining element 33, in particular the flange, is arranged in an essentially rotationally fixed fashion. The belt pulley 16 carries out a rotational movement about the axial direction AD when it is driven by means of a belt (not designated in more detail or illustrated).

In addition, the at least one first housing element 9 and/or the at least one second housing element 10 carries out a rotational movement about the axial direction AD when the belt pulley 16 is driven. The belt pulley 16 and the at least one first housing element 9 and/or the at least one second housing element 10 have identical circumferential speeds.

The drive disk 13 can also rotate about the axial direction AD. The output disk 13 rotates, in particular, about the axial direction AD, if at least one torque is transmitted from the at least one first housing element 9 and/or the at least one second housing element 10 to the output disk 13 by means of fluid friction of the viscous fluid, in particular of the silicone oil. Owing to the slip, the output disk 13 usually has a lower circumferential speed than the belt pulley 16 or the first housing element 9 and/or the second housing element 10. If the drive disk 16 is not driven and consequently the circumferential speed is 0 m/sec, the first housing element 9 or the second housing element 10 also has the circumferential speed 0 m/sec. In the illustrated exemplary embodiment, the output disk 13 is permanently connected to the impeller wheel 2, with the result that the circumferential speed of the impeller wheel 2 corresponds at all times to the circumferential speed of the output disk 13.

In the operating state, the belt pulley 16 is driven at a drive speed. This drive speed is transmitted to the first housing element 9 and/or the second housing element 10 by virtue of the positively locking connection between the belt pulley 16 and the first housing element 9 and/or the second housing element 10. The first housing element 9 and/or the second housing element 10 are cooled owing to the rotational movement during operation and owing to the fins, in particular cooling fins, which are provided. In the illustrated exemplary embodiment, the belt pulley 16 is arranged in a rotatable fashion on the retaining element 33, in particular the flange. In another exemplary embodiment, the at least one housing element 9 and/or the second housing element 10 can be arranged in a rotatable fashion on the retaining element 33, in particular the flange. In the illustrated exemplary embodiment, the first housing element 9 is arranged in such a way that it can rotate with respect to the fan shaft 6. The fan shaft 6 essentially is the output. In another exemplary embodiment (not illustrated), the fan shaft 6 is arranged and/or mounted in such a way that it can rotate with respect to the retaining element 33, in particular the flange. The sensor 24 may be, for example, a Hall sensor. The at least one first housing element 9 and/or the at least one second housing element 10 have radially extending cooling fins. In another exemplary embodiment, the cooling fins extend vertically or horizontally with respect to the axial direction AD. In addition, the cooling fins can be arranged at an angle between 0° and 90°, in particular between 15° and 80°, in particular between 25° and 70°, in particular between 30° and 60°, in particular between 40° and 50°.

The driving of the at least one first housing element 9 and/or of the at least one second housing element 10 by the belt pulley 16 results in a greater throughflow through the fins and cooling fins (not denoted in more detail) since the air for cooling flows from the inside to the outside owing to the centrifugal force. This cooling effect is improved by the flow-guiding element 8, in particular by the air-guiding element, which causes the air to be sucked in the inner diameter region of the cooling fins of the first housing element 9. The flow profile of the air is improved further by the belt pulley opening 17.

FIG. 3 shows a sectional illustration of a further embodiment of a fan drive unit 50. Identical features are provided with the same reference signs as in the previous figures.

In contrast to the fan device 1 in FIG. 2, the retaining element 51 is of a different design. The retaining element 51 is, in particular, a flange. The retaining element 51, in particular the flange, has a retaining element shaft section 54 which is formed from the retaining element 51. The retaining element 51 is formed from steel or from another metal. In particular, the retaining element 51 is manufactured by means of a primary shaping fabrication method such as, for example, molding. The retaining element 51 has at least one bore 52, in particular a plurality of bores 52, into which fastening elements such as, for example, screws, can be plugged, and with which the retaining element 51 can be connected, in particular connected in a positively locking fashion, to an engine unit (not illustrated).

The retaining element shaft section 54 of the retaining element 51, in particular of the flange, is embodied in certain sections as a solid shaft, and in certain adjoining sections as a hollow shaft. In the section which is embodied as a solid shaft, a bore 52 is provided in the retaining element. In the illustrated exemplary embodiment, the bore 52 is arranged centrally in the axial direction AD. The sensor 24 is arranged in the bore 52, which is embodied essentially in the form of a cylinder. The bore 52 is essentially of such a size that it accommodates the entirety of the sensor 24 essentially in the radial direction with respect to the axial direction AD. In contrast to FIG. 2, the actuator 56 or respectively the solenoid 57 is arranged on the outside of the retaining element shaft section 54. The actuator 56 and the solenoid 57 have a bore which is of concentric design. The bore (not denoted in more detail) of the actuator 56 or respectively of the solenoid 57 is essentially embodied in the form of a cylinder. The bore has essentially the same diameter (not denoted in more detail) as a section (not denoted in more detail) of the retaining shaft element section 54. The retaining element shaft section 54 is adjusted especially to the same diameter as the bore of the actuator 56 or respectively of the solenoid 57 using, for example, a material-removing fabrication method such as turning, milling, grinding etc.

The retaining element 51, in particular the flange, has a cavity 53 through which the actuator cable 28 and/or the sensor cable 25 are connected to the power supply in a cable duct 55.

The axially offset arrangement of the roller bearing 23 and of the actuator 56 or respectively of the solenoid 57 permits free dimensioning of the bearing 23 and of the solenoid. In particular the bearing 23 can be fabricated with relatively small internal and external diameters in an easier and more cost-effective way.

FIG. 4 is a sectional illustration of a further embodiment of a fan drive unit 70. Identical features have been provided with the same reference signs as in the previous figures.

In contrast to FIG. 2, the flow-guiding element 8 in this embodiment is integrated as a flow-guiding element 73, in particular as an air-guiding element, into the fan housing plate 72. The fan housing 71 has at least one fan housing plate 72. The fan housing 71 is essentially embodied in the same way as the fan housing 4 in FIG. 2. The fan housing plate is constructed from plastic or from a metal, in particular with a low density. For example, the fan housing plate 72 can be constructed from aluminum or else from steel. In addition, the fan housing plate 72 can be constructed from a fiber composite material. The fan housing plate 72 has at least one flow-guiding element 73 and is embodied in particular in one piece therewith. The fan housing plate 72 is manufactured, for example, by means of a primary shaping fabrication method such as molding. The housing plate 72 can also be manufactured by means of a shaping fabrication method such as, for example, pressing, punching etc. In particular, the flow-guiding element 73, in particular the air-guiding element, is formed in the fan housing plate 72 by means of a primary shaping or shaping fabrication method such as, for example, stamping or punching etc.

FIG. 5 is an isometric illustration of a fan drive device 80, of a fan 81 and of an impeller wheel 82. Identical features have been provided with the same reference signs as in the previous figures.

The fan drive device 80 which is illustrated in FIG. 5O has a fan 81 with an impeller wheel 82.

In the illustrated exemplary embodiment, the impeller wheel 82 has eleven impeller wheel blades 83. In another exemplary embodiment, the impeller wheel 82 can have one to eleven or more than eleven impeller wheel blades 83. In addition, the impeller wheel 82 has flow-guiding elements (not denoted in more detail) which are arranged on the impeller wheel blades 83 and are embodied in one piece with the impeller wheel blades 83. The impeller wheel 82 also has an impeller wheel hub 84.

FIG. 6 shows a detail illustration A of a fan drive device 80 of a fan 81 and of an impeller wheel 82.

Identical features are provided with the same reference signs as in the previous figures.

The impeller wheel 82 has a number of impeller wheel blades 83. In the illustrated exemplary embodiment, the impeller wheel blades 83 are embodied in one piece with the impeller wheel hub 84. In another exemplary embodiment, the impeller wheel blades 83 are connected to the impeller wheel hub 84 in a materially joined fashion, in particular by welding, soldering, bonding etc., and/or in a positively locking fashion. In the illustrated exemplary embodiment, the impeller wheel 82 has twelve impeller wheel blades 83. In another exemplary embodiment, the impeller wheel 82 has one to twelve impeller wheel blades 83 or more than twelve impeller wheel blades 83. In the illustrated exemplary embodiment, the impeller wheel or the fan 81 carries out a rotational movement in the direction of the impeller wheel rotational direction IWRD. Air inlet ducts 88 are formed in the impeller wheel hub 84. In the illustrated exemplary embodiment, six air inlet ducts 88 are formed in the impeller wheel hub. In another exemplary embodiment, one to six or more than six impeller wheel inlet ducts 88 are formed from the hub. In the illustrated exemplary embodiment, the at least one air inlet duct, in particular the six air inlet ducts, are formed in one piece with the impeller wheel hub 84. In another exemplary embodiment, the impeller wheel hub 84 has openings (not illustrated). In the section of the openings (not illustrated), the air inlet ducts 88 are connected to the impeller wheel hub 84 in a materially joined fashion, in particular by welding, soldering, bonding etc., and/or in a positively locking fashion.

The air inlet ducts 88 are formed essentially as an inlet diffuser. The at least one air inlet duct 88 has at least one air inlet duct opening 89. In the illustrated exemplary embodiment, the air inlet duct opening 89 is of rectangular design. In another exemplary embodiment (not illustrated), the air inlet duct opening 89 is round or oval or embodied as a combination of a round, oval or polygonal shape. Adjacent to the air inlet duct openings 89, a hub ring 87 is arranged essentially concentrically with respect to the axial direction AD. In the illustrated exemplary embodiment, the hub ring 87 is embodied in one piece with the fan 81 or the impeller wheel 82. In another exemplary embodiment, the hub ring 87 can be connected to the impeller wheel 82 in a positively locking or materially joined fashion, in particular by welding, soldering, bonding etc. In the illustrated exemplary embodiment, the hub ring 87 is formed from a metal such as, for example, stainless steel or some other steel or from aluminum. In another exemplary embodiment, the hub ring 87 can be formed from plastic or from a fiber composite material. In the illustrated exemplary embodiment, the hub ring 87 has six hub bores 86, one hub bore 86 of which is covered by an air inlet duct 88 in the isometric illustration. In another exemplary embodiment, the hub ring 87 has one to six hub bores 86 or more than six hub bores 86. In another exemplary embodiment, the hub ring composed of metal is formed in the impeller wheel 82 during the primary shaping process, in particular during the injection molding, for example during the plastic injection molding, in such a way that the plastic is injected, at least in certain sections, around the hub ring 87, with the result that the hub ring 87 is essentially permanently connected to the impeller wheel 82 after the plastic cools. In the illustrated exemplary embodiment, the air inlet ducts 88 are constructed from plastic. In another exemplary embodiment, the air inlet ducts 88 are constructed from another material with a low density such as, for example, from a metal with a low density such as, for example, from aluminum or from a fiber composite material.

If the impeller wheel 82 rotates in the direction of the impeller wheel rotational direction IWRD about the axial direction AD, air is fed in the direction of the air flow AFD through the air inlet duct opening 89 in the direction of the first housing element 9 (not illustrated) and/or of the second housing element 10, wherein the at least one first housing element 9 and/or the at least one second housing element 10 are cooled. The at least one hub bore 86, in particular the six hub bores 86, are used to fasten the fan 81 or the impeller wheel 82 in a positively locking fashion to the impeller shaft 6 (not illustrated). The air inlet ducts 88 form a radial blower, in which case the cooling fins (not illustrated) of the first housing element 9 and/or of the second housing element 10 form a type of vane. This ensures that the cooling air leaves the cooling fins (not illustrated) of the first housing element 9 at the outermost circumference and a favorable flow profile is produced. The air inlet ducts 88 can also be referred to as scoops. A plurality of the air inlet ducts 88, in particular the scoops, are arranged on the circumference of the hub bore 86 of the impeller wheel 82, resulting in an axial vane effect in combination with a retaining effect as a result of the rotation of the fan. This improves the sucking in of cooling air of the cooling fins of the first housing element 9, said cooling fins operating according to the principle of a radial fan. At the same time, the solid material cross section in this region of the impeller wheel hub 84 is retained, in contrast to simple axial openings, which is necessary for the transmission of mechanical forces of the fan 81. As a result of the box-shaped construction of the air inlet ducts 88, in particular of the scoops, the mechanical rigidity of the impeller wheel hub 84, in particular of the fan flange plate (not denoted in more detail) can be increased in the hub ring section of the hub ring 87. The hub ring 87, in particular the fan flange plate, can be fabricated as a shaped part composed of sheet metal. In another exemplary embodiment, the impeller wheel hub 84, in particular the fan flange plate, can be embodied as a cast part, in particular composed of cast lightweight metal. In the construction of the impeller wheel hub 84 from cast lightweight metal, the geometric freedom of configuration is greater. The properties of the feeding of the cooling air and of the mechanical strength can then be increased even further.

FIG. 7 shows a sectional illustration of a further exemplary embodiment of a fan drive unit 100. Identical features have been provided with the same reference signs as in the previous figures.

In contrast to the preceding exemplary embodiments, in the fan drive device 100, the actuator 101 or the solenoid 102 are arranged further behind in the retaining element shaft section 54. The cavity 53 accommodates the actuator 101 or respectively the solenoid 102, at least in certain sections. An actuator cover plate 103 for covering the actuator 101 or respectively the solenoid 102 has an opening (not denoted in more detail) from which the sensor cable (not denoted in more detail) and/or actuator cable of the actuator 101 or of the solenoid 102 is led out from the retaining element shaft section 54 and connected to the power supply (not illustrated). In this way, the actuator 101 or the solenoid 102 is subjected to less thermal loading, and the bearing 23 can be dimensioned more freely.

FIG. 8 is a sectional illustration of a further embodiment of a fan drive unit 120. Identical features have been provided with the same reference signs as in the previous figures.

In contrast to the previous figures, the belt pulley 123 is embodied as a belt pulley ring 126. The belt pulley ring 126 has an opening (not designated in more detail). In addition, the second housing element 122 has at least one threaded bore 125, in particular a plurality of threaded bores 125. The first housing element 121 also has at least one bore, which is not denoted in more detail. By means of a connecting element 124, in particular by means of a screw, the at least one belt pulley ring 126, the first housing element 121 and the second housing element 122 are connected to one another in a positively locking fashion, in particular by screwing.

The bearing 23 is arranged, at least in certain sections, in the second housing element 122. This arrangement of the roller bearing 23 is particularly advantageous with respect to the conduction away of heat from the second housing element 122 and with respect to the costs and the weight of the second housing element. However, the diameter of the belt pulley 123 and of the belt pulley ring 126 must be dimensioned so that it is sufficiently large in relation to the diameter of the first housing element 12 and/or of the second housing element 122.

In another exemplary embodiment (not illustrated), the belt pulley 123, or respectively the belt pulley ring 126, is constructed in one piece with the first housing element 121 and/or in one piece with the second housing element 122. The first housing element 121 and/or the second housing element 122 are then correspondingly embodied as a belt pulley 123 or respectively as a belt pulley ring 126.

FIG. 9 is a sectional illustration of a fan drive unit 140 with a coolant pump drive unit 141. Identical features have been provided with the same reference signs as in the previous figures.

In contrast to the previous figures, the belt pulley 146 is used to drive both the fan drive unit 140 and simultaneously a coolant pump drive unit 141.

The fluid friction clutch (not denoted in more detail), in particular the visco clutch, has a first housing element 143. In addition, the fluid friction clutch has a second housing element 145. The first housing element 143 is sealed with respect to the second housing element 145 by means of a sealing element 144, in particular an O ring. The first housing element 143 and the second housing element 145 are connected in a positively locking and/or materially joined fashion, in particular by means of a screw/nut connection. The first housing element 143 has labyrinthine cutouts 155. The at least one output disk 142 has corresponding labyrinthine cutouts 155.

By means of a viscous fluid (not denoted in more detail), in particular by means of silicone oil, at least one torque is transmitted from at least the one first housing element 143 to the output disk 142 by means of fluid friction. The output disk 142 is mounted on the fan shaft 6, or is connected to the fan shaft 6, in a positively locking and/or frictionally locking fashion. In addition, a first bearing 151 is arranged on the fan shaft 6 and in a section (not denoted in more detail) of the first housing element 143.

The first bearing 151 is a roller bearing, in particular a single-row grooved ball bearing. By means of the first bearing 151, the first housing element 143, which is driven with a drive speed or rotates with a drive circumferential speed, is mounted in such a way that it can rotate with respect to the relatively low output speed of the fan shaft 6.

The belt pulley 146 is driven by a belt (not illustrated in more detail). The belt pulley 146 is embodied in such a way that it conducts magnetic flux. The belt pulley 146 is connected to the second housing element 145 in a positively locking and/or materially joined fashion. The second housing element 145 is connected to the magnetically conductive hub 157 in a positively locking and/or materially joined fashion. The belt pulley 146 is embodied in such a way that it conducts magnetic flux, i.e. it is constructed from a material which conducts the magnetic flux or is magnetizable. The magnetically conductive hub 157 is connected to a coolant pump shaft 150 in a frictionally locking fashion. In particular, the magnetically conductive hub 157 is shrink-fitted onto the coolant pump shaft 150. The coolant pump shaft 150 has, at least in certain sections, a significant, circumferential cutout, in particular a groove, which is embodied as a bearing section. In the region of the bearing section (not denoted in more detail) a second bearing 152 is arranged. The second bearing 152 is embodied essentially as a roller bearing, in particular as a single-row grooved ball bearing. The coolant pump shaft 150 is connected to the coolant pump housing 149 in such a way that it can rotate by means of the second bearing 152, or is mounted in such a way that it can rotate with respect to the rotationally fixed coolant pump housing 149. The outer bearing ring (not denoted in more detail) of the second bearing 152 is connected in a positively locking fashion to the coolant pump housing 149 via a shaft securing ring (not denoted). The outer bearing ring (not denoted in more detail) bears, at least in certain sections, on a shoulder (not denoted in more detail) of the coolant pump housing 149. In addition, at least one shaft sealing ring 153 is provided on the shaft. The shaft sealing ring 153 prevents, in particular, bearing oil from escaping outwards from the bearing 153.

The coolant pump shaft 150 is used to drive a coolant pump 156. An actuator 147 or a solenoid 148 is arranged on the coolant pump housing 149, on a coolant pump housing section which is not denoted in more detail. The actuator 147 or the solenoid 148 is pushed onto the coolant pump housing 149 as far as a shoulder (not denoted in more detail) of the coolant pump housing 149. The actuator 147 or the solenoid 148 is arranged in a rotationally fixed fashion, in particular on the coolant pump housing 149.

The belt pulley 146, the second housing element 145 and the hub 147 are capable of conducting magnetic flux or are magnetically conductive, i.e. they can be magnetized or they conduct the magnetic flux. The magnetically conductive hub 157 is connected to a magnetic armature 159. The magnetic armature 159 is connected to a valve element 158, in particular to a valve lever. The valve element 158, in particular the valve lever, closes and/or opens a bore or opening in the bore 19 (not denoted in more detail).

In another exemplary embodiment, the magnetic-flux-conducting belt pulley 146 is constructed in one piece with the second housing element 145.

The coolant pump 156 is a water pump in the illustrated exemplary embodiment.

The second housing element 145 is constructed in such a way that it is magnetically non-conductive in the illustrated exemplary embodiment, in particular it is constructed from a material which is not magnetically conductive and which therefore serves to provide magnetic insulation between the at least two hubs 157 and the belt pulley 156.

FIG. 10 is a sectional illustration of a further embodiment of a fan drive unit 170 with a bearing bushing 171. Identical features have been provided with the same reference symbols as in the previous figures.

In contrast to the previous embodiments, the fan shaft 6 has a fan shaft bearing section 174. The fan shaft bearing section 174 is provided circumferentially in the fan shaft 6. The fan shaft bearing section 174 is provided in the fan shaft 6 by means of a material-removing fabrication method, in particular by means of grinding. The bearing bushing 171 is pushed, at least in certain sections, onto the fan shaft bearing section 174 and is in contact with it, at least in certain sections. The bearing bushing 171 is pushed on as far as a shaft shoulder 173 of the fan shaft 6 and is in contact with it at least in certain sections. In addition, the bearing bushing 171 is in contact with the inner ring of the roller bearing 11, in particular of the two-row grooved ball bearing, at least in certain sections. The bearing bushing 171 has a bearing bushing collar 172, which engages around the bearing 11, in particular the inner ring of the bearing 11.

Since the output disk 13 does not have any direct contact with the outer surroundings, its thermal loading is relatively high. Apart from via the viscous fluid, in particular the silicone oil, the output disk 13 can only conduct heat away to the surroundings via the fan shaft 6. In this context, the inner ring (not denoted in more detail) of the bearing 11 is subjected to high thermal loading. In particular, the service life of the bearing grease decreases greatly as the temperature rises so that any reduction in the bearing temperature leads to an extension of the service life of the bearing grease and/or of the bearing. For this reason, the bearing bushing 171 is constructed from a material which is a poor conductor of heat. The bearing bushing 171 is constructed, for example, from plastic. In addition, the bearing bushing 171 can also be constructed from ceramic or a fiber composite material.

FIG. 11 is a sectional illustration of a further embodiment of a fan drive unit 180 with a circumferential cutout in the bearing seat 182, which is embodied as a groove 183. Identical features have been provided with the same reference signs as in the previous figures.

In contrast to the previous figures, the fan shaft 6 has a fan shaft bearing section 181 in which a cutout 182 is provided. The cutout 182 is embodied as a groove, in particular as a circumferential groove. The groove 183 reduces the area of the fan shaft 6 over which heat can be transmitted to the bearing inner ring (not denoted in more detail) of the bearing 11.

FIG. 12 is a sectional illustration of a further embodiment of a fan drive unit 200 with a belt pulley unit 203 which can be dismounted from a fluid-flow-regulating unit 202. Identical features have been provided with the same reference symbols as in the previous figures.

The fluid-flow-regulating unit 202 can correspond, for example, to the valve lever disk 30. The flow of fluid, for example of silicone oil, which can flow into the bore 19 is regulated by means of the fluid-flow-regulating unit 202. The belt pulley unit 203 has at least the belt pulley 16, at least a bearing 23, the actuator 26, the sensor 24 and the retaining element 33.

For example for service purposes, the belt pulley unit 203 can be dismounted or separated from the fluid-flow-regulating unit 202. For example in the case of a defect in the belt of the vehicle it may be useful, when changing the belt, if the fluid-flow-regulating unit 202 can be released from the belt pulley unit, dismounted and mounted again without the fluid, in particular oil such as silicone oil, running out of the fluid-flow-regulating unit 202 or without other changes occurring. In the event of damage, for example in the event of an accident, both the fluid-flow-regulating unit 202 and the belt pulley unit 203 can be replaced independently of one another.

The dismounting and/or separation of the fluid-flow-regulating unit 202 from the belt pulley unit 203 is done by unscrewing the third fastening elements 22, in particular screws. This is made possible by an oil-tight closure of the fluid-flow-regulating unit 202, which is formed, for example, by a closure capsule 201 which is connected to the second housing element 10, in particular in a materially joined and/or positively locking fashion. The closure capsule 201 can also be inserted into the housing element 10. The closure capsule 201 is constructed with thin walls composed of a magnetically non-conducting material such as, for example, plastic. Owing to the small wall thickness, the closure capsule 201 permits magnetic fields to pass through both to activate the magnetic armature and to activate the sensor 24. The closure capsule 201 can also be formed by a thin-walled embodiment of the housing element 10.

The features of the various exemplary embodiments can be combined with one another as desired. The invention can also be used for fields other than those indicated.

The invention claimed is:

1. A fan drive device, comprising:
    an impeller wheel;
    at least one retaining element configured to be fastened to an engine unit, the at least one retaining element comprising a cavity;
    at least one housing element having a fluid storage space, a bore, and a torque-transmitting space therein, the fluid storage space being in fluidic connection with the torque-transmitting space via the bore, wherein the at least one housing element is rotatable relative to the at least one retaining element;
    an output disk connected to the impeller wheel and selectively connectable to the at least one housing element such that the at least one housing element selectively transmits a torque to the output disk by fluid friction created using a fluid;
    a valve element comprising a valve lever disk that is rotatably connected to the at least one housing element and configured to control whether the bore is in fluidic connection with the storage space; and
    an actuator, at least a portion of which is inside the cavity of the at least one retaining element, the actuator being configured to selectively activate the valve element.

2. The fan drive device as claimed in claim 1, wherein at least a portion of at least one sensor is arranged in the at least one retaining element.

3. The fan drive device as claimed in claim 1, wherein the actuator is a solenoid.

4. The fan drive device as claimed in claim 1, wherein the at least one housing element is drivable by at least one belt pulley.

5. The fan drive device as claimed in claim 4, wherein the storage space rotates at at least a drive speed of the belt pulley.

6. The fan drive device as claimed in claim 4, wherein the belt pulley has at least one belt pulley opening for cooling the housing element.

7. The fan drive device as claimed in claim 4, wherein the belt pulley is connected to the at least one housing element in a positive locking fashion.

8. The fan drive device as claimed in claim 4, wherein the fan drive device has at least one bearing for supporting the at least one housing element and/or the belt pulley.

9. The fan drive device as claimed in claim 1, wherein the retaining element is a flange which is arranged in a rotationally fixed fashion.

10. The fan drive device as claimed in claim 1, wherein the at least one housing element has first concentric labyrinthine cutouts, and the output disk has second concentric labyrinthine cutouts corresponding to the first concentric labyrinthine cutouts.

11. The fan drive device as claimed in claim 10, wherein the fluid is flowable through at least a portion of the first and second cutouts, such that the torque of the housing element can be transmitted to the output disk.

12. The fan drive device as claimed in claim 1, wherein the valve lever disk is selectively pivotable about a fastening point.

13. The fan drive device as claimed in claim 1, wherein the fan drive device has at least one soft-magnetic conducting element.

14. The fan drive device as claimed in claim 1, wherein at least one sensor element for measuring output speed is arranged on a fan flange shaft.

15. The fan drive device as claimed in claim 14, wherein the sensor element is for measuring the output speed and/or is a Hall sensor.

16. The fan drive device as claimed in claim 14, wherein at least one first cable for supplying power to the actuator and/or a second cable for supplying power to the sensor element are arranged in the retaining element.

17. The fan drive device as claimed in claim 1, wherein the at least one housing element comprises cooling fins.

18. The fan drive device as claimed in claim 1, wherein the output disk has at least one output disk opening for cooling at least one hub section of the output disk.

19. The fan drive device as claimed in claim 1, wherein at least one bearing seat section of a fan shaft has at least one cutout for cooling the output disk.

20. The fan drive device as claimed in claim 19, wherein at least one bearing bushing is arranged on the at least one bearing seat section of the fan shaft in order to cool the output disk.

21. The fan drive device as claimed in claim 1, further comprising at least one belt pulley unit that is selectively dismountable from a fluid-flow-regulating unit.

22. The fan drive device as claimed in claim 1, wherein the impeller wheel comprises a flange plate having at least one opening configured to allow a flow of air through the opening to the at least one housing element, such that the at least one housing element is cooled by the flow of air.

23. The fan drive device as claimed in claim 22, wherein the at least one flange plate comprises a flow-guiding element for cooling the housing element.

24. The fan drive device as claimed in claim 22, wherein the at least one flange plate comprises a radial blower for cooling the housing element.

25. The fan drive device as claimed in claim 22, wherein the at least one opening is embodied as a scoop for cooling the housing element.

26. A fan drive device, comprising:
an impeller wheel;
at least one retaining element configured to be fastened to an engine unit, the at least one retaining element comprising a cavity;
at least one housing element having a fluid storage space, a bore, and a torque-transmitting space therein, the fluid storage space being in fluidic connection with the torque-transmitting space via the bore, wherein the at least one housing element is rotatable relative to the at least one retaining element;
an output disk connected to the impeller wheel and selectively connectable to the at least one housing element such that the at least one housing element selectively transmits a torque to the output disk by fluid friction created using a fluid;
a valve element configured to control whether the bore is in fluidic connection with the storage space; and
an actuator, at least a portion of which is inside the cavity of the at least one retaining element, the actuator being configured to selectively activate the valve element,
wherein the impeller wheel comprises a flange plate having at least one opening configured to allow a flow of air through the opening to the at least one housing element, such that the at least one housing element is cooled by the flow of air, and
wherein the at least one flange plate comprises a radial blower for cooling the housing element.

27. A fan drive device, comprising:
an impeller wheel;
at least one retaining element configured to be fastened to an engine unit, the at least one retaining element comprising a cavity;
at least one housing element having a fluid storage space, a bore, and a torque-transmitting space therein, the fluid storage space being in fluidic connection with the torque-transmitting space via the bore, wherein the at least one housing element is rotatable relative to the at least one retaining element;
an output disk connected to the impeller wheel and selectively connectable to the at least one housing element such that the at least one housing element selectively transmits a torque to the output disk by fluid friction created using a fluid;
a valve element configured to control whether the bore is in fluidic connection with the storage space; and
an actuator, at least a portion of which is inside the cavity of the at least one retaining element, the actuator being configured to selectively activate the valve element,
wherein the impeller wheel comprises a flange plate having at least one opening configured to allow a flow of air through the opening to the at least one housing element, such that the at least one housing element is cooled by the flow of air, and wherein the at least one opening is embodied as a scoop for cooling the housing element.

28. A fan drive device, comprising:
an impeller wheel;
at least one retaining element configured to be fastened to an engine unit, the at least one retaining element comprising a cavity;
at least one housing element having a fluid storage space, a bore, and a torque-transmitting space therein, the fluid storage space being in fluidic connection with the torque-transmitting space via the bore, wherein the at least one housing element is rotatable relative to the at least one retaining element;

an output disk connected to the impeller wheel and selectively connectable to the at least one housing element such that the at least one housing element selectively transmits a torque to the output disk by fluid friction created using a fluid;

a valve element configured to control whether the bore is in fluidic connection with the storage space; and an actuator, at least a portion of which is inside the cavity of the at least one retaining element, the actuator being configured to selectively activate the valve element, wherein at least one bearing seat section of a fan shaft has at least one cutout for cooling the output disk.

29. The fan drive device as claimed in claim 28, wherein at least one bearing bushing is arranged on the at least one bearing seat section of the fan shaft in order to cool the output disk.

* * * * *